(12) United States Patent
Zohar et al.

(10) Patent No.: US 7,302,604 B2
(45) Date of Patent: Nov. 27, 2007

(54) REMOTE MANAGEMENT COMMANDS IN A MASS STORAGE SYSTEM

(75) Inventors: Ofir Zohar, Alfe-Menashe (IL); Yaron Revah, Tel-Aviv (IL); Haim Helman, Ramat Gan (IL); Dror Cohen, Tel Aviv (IL); Shemer Schwartz, Herzelia (IL)

(73) Assignee: XIV Ltd., Tel-Aviv (IL)

( * ) Notice: Subject to any disclaimer, the term of this patent is extended or adjusted under 35 U.S.C. 154(b) by 329 days.

(21) Appl. No.: 11/057,934

(22) Filed: Feb. 15, 2005

(65) Prior Publication Data

US 2006/0090050 A1 Apr. 27, 2006

Related U.S. Application Data

(60) Provisional application No. 60/620,696, filed on Oct. 22, 2004.

(51) Int. Cl.
*G06F 12/16* (2006.01)
(52) U.S. Cl. .............................. 714/6; 714/5; 711/162
(58) Field of Classification Search ................... None
See application file for complete search history.

(56) References Cited

U.S. PATENT DOCUMENTS 5,212,784 A * 5/1993 Sparks ........................ 714/6
5,742,792 A    4/1998 Yanai et al.
5,889,935 A    3/1999 Ofek et al.
6,442,551 B1   8/2002 Ofek
6,496,908 B1  12/2002 Kamvysselis et al.
6,549,921 B1   4/2003 Ofek
2003/0126388 A1 * 7/2003 Yamagami .................. 711/162

OTHER PUBLICATIONS

James Gray, et al., "Transaction Processing: Concepts and Techniques" pp. 5-22, Morgan Kauffman Publishers, San Mateo, California, 1993.

* cited by examiner

*Primary Examiner*—B. James Peikari
(74) *Attorney, Agent, or Firm*—Katten Muchin Rosenman LLP

(57) ABSTRACT

A method for managing activity of a data storage system including a primary storage facility and a secondary storage facility. The method includes mirroring a first logical unit in the primary facility on a second logical unit in the secondary facility, and receiving a command to perform a data storage management activity on the first logical unit. The method further includes synchronizing the second logical unit with the first logical unit responsive to the command, and performing the command on the first logical unit and the second logical unit simultaneously following synchronization.

16 Claims, 2 Drawing Sheets

REMOTE MANAGEMENT COMMANDS IN A MASS STORAGE SYSTEM

CROSS-REFERENCE TO RELATED APPLICATION

This application claims the benefit of U.S. Provisional Patent Application 60/620,696, filed Oct. 22, 2004, which is incorporated herein by reference.

FIELD OF THE INVENTION

The present invention relates generally to methods and apparatus for data storage. More particularly, the present invention relates to a method and apparatus for performing management activities on multiple data storage facilities.

BACKGROUND OF THE INVENTION

Remote mirroring is a well-known approach for data protection in data processing systems, especially for systems that handle mission-critical data. In a standard mirroring configuration, a mass storage network comprises two data storage facilities, located at separate locations and connected by communication lines. A first facility is a local or primary facility, and a second facility is a remote or secondary facility configured to mirror data in the first. A host whose data requests are being served by the storage network is connected to the primary facility.

Mirroring mechanisms, within or ancillary to the primary and secondary facilities, ensure that input/output (I/O) transactions communicated from the host to the primary facility are also communicated to the secondary facility, so that data stored in the primary is substantially the same as data stored in the secondary.

In the present disclosure, a transaction is assumed to be a sequence of one or more computer operations, In the present disclosure, a transaction is assumed to be a sequence of one or more computer operations, performed by a computing system, which change a state of the system. *Transaction Processing: Concepts and Techniques*, by Gray and Reuter, published by Morgan Kaufmann Publishers, San Mateo Calif. (1993), describes transactions and their processing in detail, and section 1.2, entitled "What Is a Transaction Processing System," is incorporated herein by reference.

As stated in section 1.2, a transaction has the properties of Atomicity, Consistency, Isolation, and Durability (ACID). The properties may be summarized as follows:

Atomicity Either all operations happen or none happen.
Consistency The transaction must result in a correct transformation of the state. The transaction must be a "correct program."
Isolation Even though transactions execute concurrently, it appears to each transaction, T, that others executed either before T or after T.
Durability Once a transaction completes successfully (commits), its changes to the state survive failures.

One purpose of the mirroring mechanisms described above is that in case of a disaster occurring at the physical site of the primary facility (e.g., fire, flood, and earthquake), the secondary facility can take the place of the primary facility and data processing operations can continue.

In one implementation of remote mirroring, the two facilities are synchronized at the level of an individual I/O transaction. Each I/O transaction initiated by the host is not acknowledged by the primary facility until the primary has performed all the tasks associated with the transaction and has also received acknowledgement from the secondary that it, too, has performed all the associated tasks. Thus, at any given moment, there is substantially no difference between the two facilities, and in the event of a failure of either or both facilities, virtually no data is lost.

There are alternative, asynchronous implementations known in the art, whereby the state of the secondary may lag by several transactions. In general, asynchronous schemes trade a gain in performance against a risk of losing some data in the event of storage failure. In the event of a failure of either or both facilities, data "lagging" between the two facilities may be lost, and the corresponding transactions may need to be processed again.

Whereas the main aim and usage of the storage network is to perform I/O tasks vis-à-vis one or more hosts, there are ancillary activities that must be performed at each facility in support of the main usage. These activities are generally data storage management activities, which include bringing a storage facility "on-line", creating and deleting areas that can be used by host applications for data storage (logical units, files, data objects, etc.), modifying the properties of these storage areas, performing backup operations, and other associated commands. Data storage management activities are generally performed independently for each facility comprising the system. Typically, a management module, either operating from the host or from a separate console, is used to initiate the data storage management activities by issuing data storage management commands.

Backup operations include the creation of point-in-time (PiT) copies, also called concurrent copies, Business Continuance Volumes (BCVs), or snapshots or some other names used in the art. A PiT copy is generated either at the primary or at the secondary facility, and, subsequent to generation, may be moved to an archival facility such as magnetic tape storage. If an identical PiT copy is required at both the primary and the secondary facility, it is first generated at one and then transmitted to the other.

U.S. Pat. No. 6,549,921 to Ofek, whose disclosure is incorporated herein by reference, describes a data network with a remote data facility for providing redundant data storage and for enabling concurrent point-in-time backup operations. A local data processing system with a data facility stores a data base and processes applications. A second system, physically separated from the first system, includes a data facility that normally mirrors the data in the first system. In a backup mode, the second system is enabled to transfer data for backup from its data facility to a backup facility concurrently with, but independently of, the operations of the first system.

U.S. Pat. No. 6,442,551 to Ofek, whose disclosure is incorporated herein by reference, describes a data network with data storage facilities for providing redundant data storage and for enabling concurrent access to the data for multiple purposes. A first data processing system with a first data facility stores a data base and processes transactions or other priority applications. A second data storage facility, that may be physically separated from the first data storage facility, mirrors the data in the first data storage facility. In a concurrent access operating mode, the second data storage facility makes the data available to an application concurrently with, but independently of, the operation of the other application. On completion of the concurrent operation, the second data storage facility can reconnect with and synchronizes with the first data storage facility thereby to reestablish the mirroring operation.

U.S. Pat. No. 6,496,908 to Kamvysselis, et al., whose disclosure is incorporated herein by reference, describes a system for mirroring source data to two or more mirrors includes first and second processors designated to communicate with first and second remote mirrors, respectively. First and second queues in the system receive requests to mirror source data at first and second mirrors, respectively. Each of the queues is periodically scanned by a processor corresponding to the mirror associated with that queue. A mask provides information indicative of any pending mirror requests for sending the source data to the first and second mirrors.

U.S. Pat. No. 5,889,935 to Ofek, et al., whose disclosure is incorporated herein by reference, describes a system wherein a host computer directly accesses a primary volume, and data written to a primary volume is automatically sent over the link to a corresponding secondary volume. Each write request transmitted over the link between the data storage systems includes not only the data for at least one track in the secondary volume to be updated but also the current "invalid track" count for the secondary volume. Therefore, once a disaster occurs that destroys the data storage system containing the primary volume, the data storage system containing the secondary volume has an indication of the degree of consistency of the secondary volume. The "invalid track" count can be used to determine an appropriate recovery operation for the volume.

U.S. Pat. No. 5,742,792 to Yanai et al., whose disclosure is incorporated herein by reference, describes a remote data mirroring system comprising two data storage systems coupled by a data link. Each system comprises signal processors which perform activities such as monitoring of respective system controllers.

SUMMARY OF THE INVENTION

Embodiments of the present invention provide efficient methods and apparatus for performing simultaneous data storage management commands at a primary facility and at a secondary facility, when the two facilities are operating in a mirroring configuration.

In an embodiment of the present invention, a first logical unit in the primary facility is mirrored on a second logical unit in the secondary facility. A data storage management command to perform a data storage management activity is sent to the primary facility. In response to the command, the second logical unit is synchronized with the first logical unit, typically by forming an index of differences between the units. Following the synchronization, the command is performed simultaneously on both units. The process of synchronization involves very little data transfer between the two units, and thus enables the data storage management activity to be performed simultaneously on both units extremely quickly and efficiently.

In one embodiment, the data storage management command is a point-in-time (PiT) copy command that generates identical PiT copies of logical units at both the primary facility and the secondary facility. In response to the PiT copy command, the primary facility sets a synchronization juncture of a state of the first logical unit. Subsequently, the primary facility transmits a command to the secondary facility to synchronize to the state of the synchronization juncture. After the two facilities have synchronized, they generate PiT copies that are bit-for-bit identical.

Thus, when identical PiT copies are required at both the primary and secondary facilities, embodiments of the present invention circumvent the need to transmit a PiT copy generated at one storage facility to the other storage facility. Instead of transmitting an entire PiT copy from one facility to the other, only a command needs to be transmitted.

There is therefore provided, in accordance with an embodiment of the present invention, a method for managing activity of a data storage system including a primary storage facility and a secondary storage facility, including:

mirroring a first logical unit in the primary facility on a second logical unit in the secondary facility;

receiving a command to perform a data storage management activity on the first logical unit;

responsive to the command, synchronizing the second logical unit with the first logical unit; and performing the command on the first logical unit and the second logical unit simultaneously following synchronization.

Typically the data storage management activity includes at least one of creating a data storage area, deleting the data storage area, modifying a property of the data storage area, performing a backup of the data storage area, defining a logical unit, deleting the logical unit, modifying a property of the logical unit, replication of the logical unit, and performing a data restore operation on the logical unit.

The command may include a point-in-time copy command.

Furthermore, in an embodiment of the invention, performing the command simultaneously means implementing the data storage management activity in an atomic, consistent, isolated, and durable manner.

Typically, synchronizing the second logical unit with the first logical unit includes:

forming at the primary storage facility an indication of a difference between a state of the first logical unit and a state of the second logic unit;

conveying the indication to the secondary storage facility; and implementing the state of the second logical unit to be identical to the state of the first logical unit in response to the indication.

Implementing the state of the second logical unit to be identical to the state of the first logical unit may include transmitting a further command between the first and second logical units.

Furthermore, the data storage system may operate synchronously.

Typically, the system is implemented to perform input/output (I/O) transactions, and the data storage management activity is different from the I/O transactions.

There is further provided, in accordance with an embodiment of the present invention, apparatus for managing activity of a data storage system, including:

a primary storage facility including a first logical unit;

a secondary storage facility including a second logical unit which mirrors the first logical unit; and one or more processors which are adapted to:

receive a command to perform a data storage management activity on the first logical unit, responsive to the command, perform a synchronization of the second logical unit with the first logical unit, and perform the command on the first logical unit and the second logical unit simultaneously following the synchronization.

Typically, the one or more processors are adapted to perform at least one of creating a data storage area, deleting the data storage area, modifying a property of the data storage area, performing a backup of the data storage area, defining a logical unit, deleting the logical unit, modifying a property of the logical unit, replication of the logical unit, and performing a data restore operation on the logical unit.

In a further embodiment of the invention, the one or more processors are adapted to implement the data storage management activity to be atomic, consistent, isolated, and durable.

Furthermore, the one or more processors may be adapted to:

form at the primary storage facility an indication of a difference between a state of the first logical unit and a state of the second logic unit, convey the indication to the secondary storage facility, and implement the state of the second logical unit to be identical to the state of the first logical unit in response to the indication.

The present invention will be more fully understood from the following detailed description of the embodiments thereof, taken together with the drawings in which:

DETAILED DESCRIPTION OF EMBODIMENTS

Figure 1:
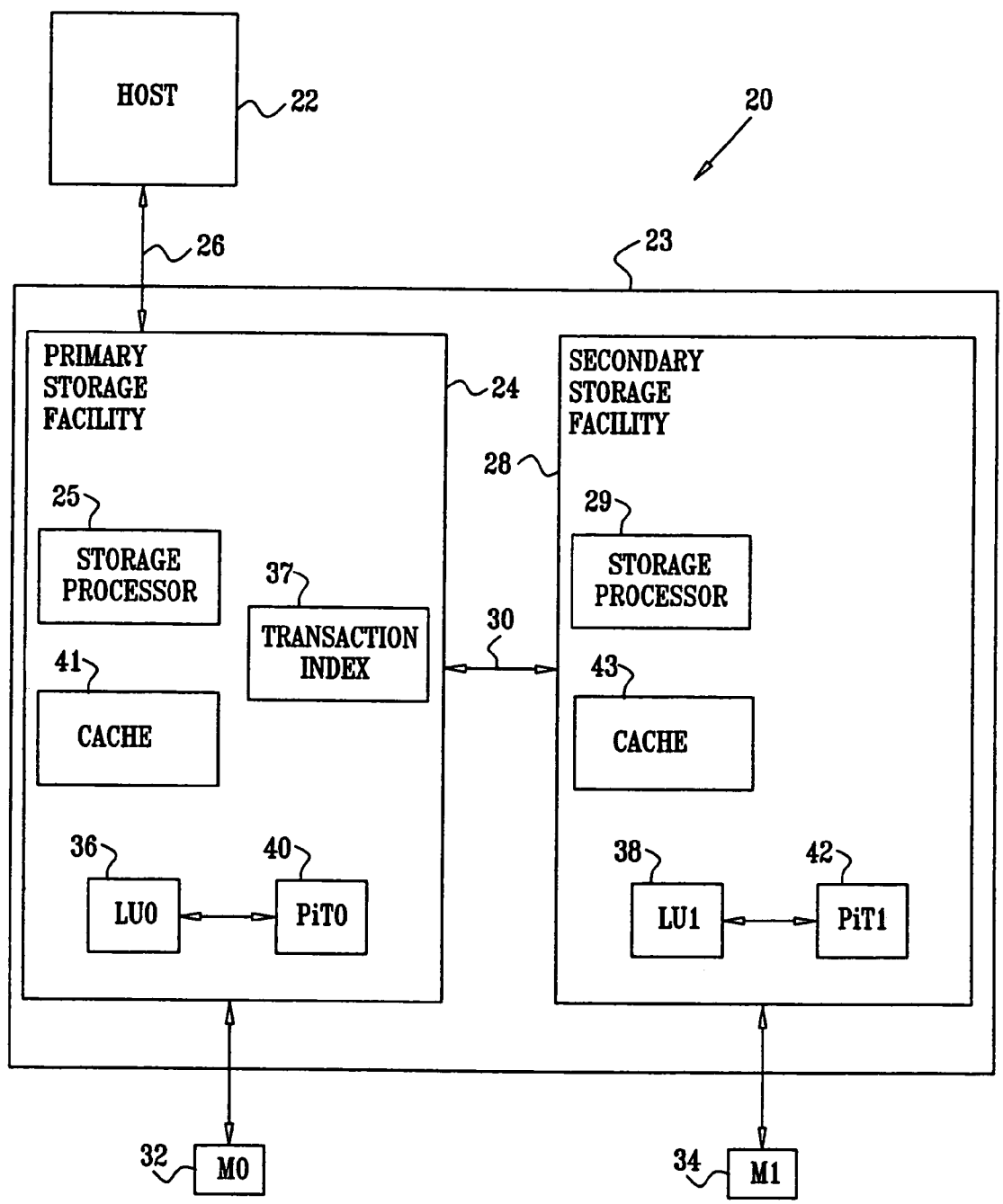
FIG. 1 is a block diagram of a data processing system, in accordance with an embodiment of the present invention.

FIG. 1 is a block diagram of a data processing system 20, in accordance with an embodiment of the present invention. System 20 comprises a host 22 and a data storage network 23. Data storage network 23 comprises a primary storage facility 24 and a secondary storage facility 28, operating in a mirroring configuration. Primary storage facility 24 comprises data storage areas, represented by an exemplary logical unit 36 (also referred to herein as unit LU0), as well as one or more processing units 25, by which primary storage facility 24 performs commands and communication tasks described hereinbelow. Similarly, secondary storage facility 28 comprises data storage areas, represented by an exemplary logical unit 38 (also referred to herein as unit LU1) as well as one or more processing units 29, by which secondary storage facility 28 performs the commands and communication tasks. Facility 24 and facility 28 have respective caches 41 and 43, which are used by respective processors 25 and 29 during operation of the facilities.

Primary storage facility 24 and secondary storage facility 28 communicate with each over a communications channel 30. Host 22 is connected to primary storage facility 24 by a communications channel 26, over which host 22 transmits input/output (I/O) transactions, comprising storing data to, and reading stored data from, primary storage facility 24. Communication channels 26 and 30 may use any communication medium for data communications known in the art, including wired, fiber optic, and wireless media. Typically, each channel operates using a high speed interconnection system such as Infiniband or PCI-X, although any other convenient interconnection system may be used. Host 22 is representative of a wide range of computing platforms, such as a mainframe or distributed computing platforms that may run applications. Such applications include, but are not limited to data processing applications (e.g., banking or billing applications), for which data mirroring is utilized.

Secondary storage facility 28 provides remote mirroring of some or all of the data areas used by primary storage facility 24 to store data in response to the I/O transactions received from host 22. In particular, by way of example, in system 20 unit LU1 is assumed to mirror unit LU0.

The remote mirroring may be synchronous, asynchronous, or may comprise combinations thereof. Whichever mirroring scheme is operative in system 20, I/O transactions transmitted by host 22 to primary storage facility 24, and comprising any change of data on unit LU0, are also sent to secondary storage facility 28 to be performed on unit LU1. In an embodiment of the present invention the mirroring scheme further comprises the maintenance of a transaction index 37 at facility 24, indicative of the transactions that have been performed on unit LU0 but have not been performed on unit LU1, as may occur in the asynchronous mirroring scheme. It will be understood that index 37 is indicative of a difference in states of unit LU0 and unit. LU1, and that any other convenient indication of the difference in states may be used. Such an indication includes, but is not limited to, a metric derived from tracking of one or more queues of transactions being performed on facilities 24 and 28, or that is indicative of such transactions. The indication may also be derived, for example, from one or more bit maps and/or one or more hash tables that track or are indicative of the transactions. Other such indications will be familiar to those skilled in the art, and all such indications are assumed to be comprised within the scope of the present invention. Hereinbelow, by way of example, the indication of the difference in states between unit LU0 and unit LU1 is assumed to comprise index 37. It will be appreciated that for synchronous mirroring, transaction index 37 may be null, indicating that substantially all transactions performed on unit LU0 have been performed on unit LU1.

Primary storage facility 24 is also connected to a management module 32, also referred to herein as module M0. Similarly, secondary storage facility 28 is connected to a management module 34, also referred to herein as module M1. Management modules M0 and M1 operate software applications that may be run from independent software platforms, or from the same platform, and these one or more platforms may be dedicated solely to the management modules or may run additional applications. In one embodiment of the present invention, the functions of management modules M0 and M1 may be combined into one manager application.

By means of the management modules, a human operator may issue a data storage management command to perform a data storage management activity on one of the primary or secondary data storage facilities, or the modules may have been programmed by the operator to issue such a command. Such a data storage management activity, performed in response to a respective management command, includes defining and deleting logical units, as well as modifying the properties of logical units on their respective storage systems. Other data management activities include initiation and performance of backup, replication, and data restore operations on the storage facilities. In the specification and in the claims, a data management activity is assumed to be any activity performed by the one or more processors 25 and/or 29 that is different from, and so does not comprise, an I/O transaction.

All such data management activities are assumed to have the ACID properties of transactions, i.e., each activity is assumed to be Atomic, Consistent, Isolated, and Durable. Transactions and their properties are described in more detail in the Background of the Invention. Thus, from the point of view of the operator, all operations involved in a specific data management activity are simultaneous.

An example of a data storage management command is a point-in-time (PiT) copy command that activates the generation of identical PiT copies 40 and 42, also herein respectively termed copies PiT0 and PiT1, on primary storage 24 and on secondary storage 28.

Figure 2:
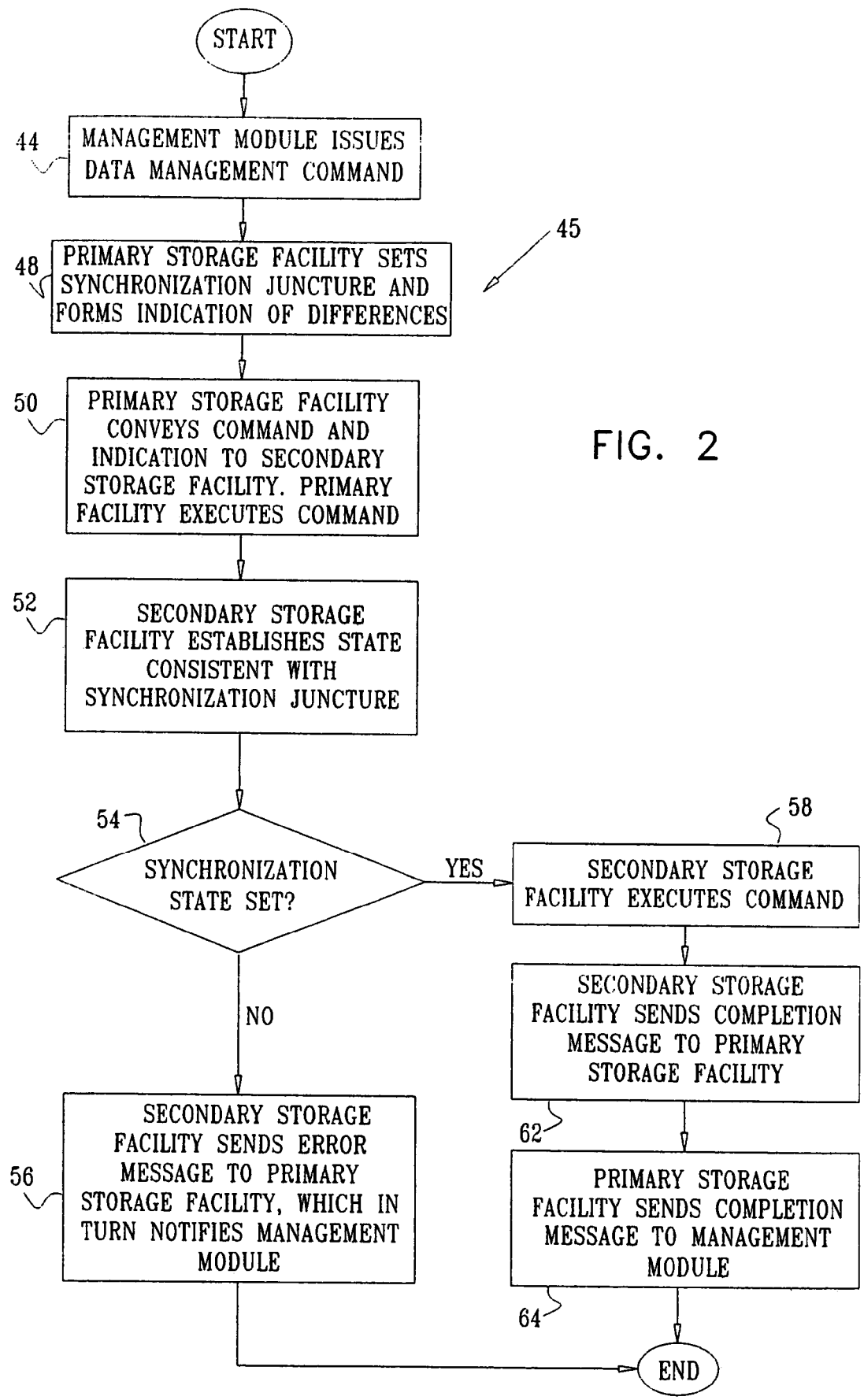
FIG. 2 is a flow diagram showing steps involved in a data management activity performed in the system of FIG. 1, in accordance with an embodiment of the present invention.

FIG. 2 is a flow diagram showing steps involved in a process 45 for performing a data management activity using the PiT copy command, in accordance with an embodiment of the present invention. Process 45 generates copies PiT0 and PiT1 that are identical with each other, and the copies are generated simultaneously according to the transaction properties stated above.

In an initial step 44, management module M0 issues the PiT copy command to facility 24. It will be understood that the PiT copy command is distinct from a command to generate a single PiT copy of unit LU0, in which case storage facility 24 would perform the command independently of secondary storage facility 28.

Responsive to receiving the PiT copy command, primary storage facility 24, in a step 48, sets a synchronization juncture, which determines a specific, internally consistent state of unit LU0 relative to a recent flow of completed I/O transactions. At this juncture, processor 25 lists in transaction index 37 a set of transactions that have been completed in facility 24 and that are to be completed at the secondary storage facility in order to bring unit LU1 into synchronization with unit LU0, i.e., so that units LU0 and LU1 are in substantially the same states. Index 37 thus acts as an indication of differences between states of unit LU0 and unit LU1.

In a step 50, primary storage facility 24 conveys via channel 30 an internal network command, together with the indication of differences index 37, to secondary storage facility 28. The internal network command instructs facility 28 to complete the transactions in the transaction index so as to achieve synchronization with facility 24, and to subsequently begin generation of PiT1. Typically, primary storage facility 24 begins generating PiT0 at this time; alternatively, facility 24 may wait to begin the generation of PiT0 until notified by the secondary storage facility that synchronization has been achieved.

In a step 52, secondary storage facility 28 performs transaction tasks necessary for becoming consistent with the synchronization juncture. After performing these tasks, the secondary storage facility, in a decision step 54, makes a final determination as to whether or not it has achieved a state of synchronization with facility 24. If the state has not been achieved, then in a step 56, the secondary storage facility sends an error message to primary storage facility 24, and process 45 ends. The primary storage facility subsequently notifies module M0 that the PiT copy command can not be completed.

If secondary storage facility 28 determines that in step 54 it has achieved the state of synchronization, then in a step 58 the secondary storage facility begins generation of PiT1. If, as described above with reference to step 50, facility 24 is waiting for notification of this, facility 28 notifies the primary storage facility that the state of synchronization has been achieved.

When the secondary storage facility completes the generation of PiT1, it sends an acknowledgement of successful completion to the primary storage facility in a step 62. When the primary storage facility receives this acknowledgement and when the primary facility has itself completed generating PiT0, then the primary facility sends an acknowledgement of successful completion of the PiT copy command to module M0 in a final step 64, and process 45 ends.

It will be understood that the regular I/O activity of host 22 and the regular mirroring activities between the storage facilities may continue while the PiT copies of process 45 are being generated. For example, while PiT0 is being generated, host 22 may initiate an I/O transaction that would change data at a particular site on unit LU0. If the old data at this site has not yet been written to PiT0, then primary storage facility 24 first copies the old data to PiT0 or to cache 41, from which it will be written to PiT0. Only after the old data has been safely moved in this manner is the new data written to unit LU0. Similarly, when this I/O transaction is transferred by the mirroring scheme to secondary storage facility 28, if the old data on unit LU1 has not yet been written to PiT1, then the old data is first moved to PiT1 or to cache 43, and only then is the new data written to unit LU1.

It will be appreciated that in generating PiT1 there is no transfer of data from unit LU0 or PiT0 via channel 30, and that the only data transfer required to make the two PiT copies is that of the internal network command, and index 37 for synchronization. Consequently, there is considerably less load on channel 30 compared with prior art systems for performing data storage management activities such as multiple PiT copies, where data transfer from unit LU0 occurs. Thus, embodiments of the present invention enable multiple data storage management activities to be performed simultaneously in a quick and efficient manner.

It will also be understood that process 45 is one example of a method for performing a data management activity, and that variations on the process, wherein an internal network command and an index of synchronization are transferred, are possible. For example, in step 50, facility 24 may wait until it has received notification from facility 28 that it has generated PiT1 before beginning generation of PiT0, and in step 58 facility 28 provides the notification. Other methods for performing a data management activity will be apparent to those skilled in the art, and all such methods are assumed to be within the scope of the present invention.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

We claim:

1. A method for managing activity of a data storage system including a primary storage facility and a secondary storage facility, comprising:
   mirroring a first logical unit in the primary facility on a second logical unit in the secondary facility;
   configuring the primary storage facility to perform data storage management activities in response to respective management commands;
   configuring the secondary storage facility to perform, in response to the respective management commands, the data storage management activities;
   receiving a management command selected from the respective management commands to perform a one of the data storage management activities on the first logical unit;
   responsive to the management command, synchronizing the second logical unit with the first logical unit; and performing the management command on the first logical unit and the second logical unit simultaneously following synchronization.

2. The method according to claim 1, wherein the data storage management activities comprise at least two of creating a data storage area, deleting a data storage area, modifying a property of a data storage area, performing a backup of a data storage area, defining a logical unit, deleting a logical unit, modifying a property of a logical unit, replication of a logical unit, and performing a data restore operation on a logical limit.

3. The method according to claim 1, wherein the management commands comprise a point-in-time copy command, and wherein the data storage management activities comprise generating a point-in-time copy in response to the point-in-time copy command.

4. The method according to claim 1, wherein performing the management command simultaneously comprises implementing the data storage management activities to be atomic, consistent, isolated, and durable.

5. The method according to claim 1, wherein synchronizing comprises:
   forming at the primary storage facility an indication of a difference between a state of the first logical unit and a state of the second logical unit;
   conveying the indication to the secondary storage facility; and
   implementing the state of the second logical unit to be identical to the state of the first logical unit in response to the indication.

6. The method according to claim 5, wherein implementing the state of the second logical unit to be identical to the state of the first logical unit comprises transmitting a further management command between the first and second logical units.

7. The method according to claim 1, wherein the data storage system operates synchronously.

8. The method according to claim 1, wherein the system is implemented to perform input/output (I/O) transactions, and wherein the data storage management activities are different from the I/O transactions.

9. Apparatus for managing activity of a data storage system, comprising:
   a primary storage facility comprising a first logical unit, wherein the primary storage facility is configured to perform data storage management activities in response to respective management commands;
   a secondary storage facility comprising a second logical unit which mirrors the first logical unit, wherein the secondary storage facility is configured to perform, in response to the respective management commands, the data storage management activities; and
   one or more processors which are adapted to:
   receive a management command, selected from the respective management commands, to perform one of the data storage management activities on the first logical unit,
   responsive to the management command, perform a synchronization of the second logical unit with the first logical unit, and
   perform the management command on the first logical unit and the second logical unit simultaneously following the synchronization.

10. The apparatus according to claim 9, wherein the one or more processors are adapted to perform as the respective management activities at least two of creating a data storage area, deleting a data storage area, modifying a property of a data storage area, performing a backup of a data storage area, defining a logical unit, deleting a logical unit, modifying a property of a logical unit, replication of a logical unit, and performing a data restore operation on a logical unit.

11. The apparatus according to claim 9, wherein the management commands comprise a point-in-time copy command, and wherein the data storage management activities comprise generating a point-in-time copy in response to the point-in-time copy command.

12. The apparatus according to claim 9, wherein the one or more processors are adapted to implement the data storage management activities to be atomic, consistent, isolated, and durable.

13. The apparatus according to claim 9, wherein the one or more processors are adapted to:
   form at the primary storage facility an indication of a difference between a state of the first logical unit and a state of the second logical unit,
   convey the indication to the secondary storage facility, and
   implement the state of the second logical unit to be identical to the state of the first logical unit in response to the indication.

14. The apparatus according to claim 13, wherein implementing the state of the second logical unit to be identical to the state of the first logical unit comprises transmitting a further management command between the first and second logical units.

15. The apparatus according to claim 9, wherein the data storage system operates synchronously.

16. The apparatus according to claim 9, wherein the system is implemented to perform input/output (I/O) transactions, and wherein the data storage management activities are different from the I/O transactions.

* * * * *